(12) United States Patent
Katayama

(10) Patent No.: US 8,214,413 B2
(45) Date of Patent: Jul. 3, 2012

(54) ELECTRONIC CALCULATOR WITH A FORMULA DISPLAY FUNCTION

(75) Inventor: Yoshinaga Katayama, Kawasaki (JP)

(73) Assignee: Casio Computer Co., Ltd., Tokyo (JP)

( * ) Notice: Subject to any disclaimer, the term of this patent is extended or adjusted under 35 U.S.C. 154(b) by 709 days.

(21) Appl. No.: 12/388,632

(22) Filed: Feb. 19, 2009

(65) Prior Publication Data

US 2009/0210466 A1   Aug. 20, 2009

(30) Foreign Application Priority Data

Feb. 19, 2008   (JP) ................. 2008-037822

(51) Int. Cl.
*G06F 3/00* (2006.01)
(52) U.S. Cl. ........ 708/136; 708/130; 708/137; 708/142; 708/171
(58) Field of Classification Search .......... None
See application file for complete search history.

(56) References Cited

FOREIGN PATENT DOCUMENTS

JP    2007-264765 A    10/2007

OTHER PUBLICATIONS

Casio Computer Co. Ltd, fx82ES Users Guide; http://web.archive.org/web/20070126234700/http://ftp.casio.co.jp/pub/world_manual/edu/en/fx-82ES_83ES.etc_Eng.pdf; pp. 1-54.*
Japanese Office Action dated Jan. 5, 2010 and English translation thereof issued in a counterpart Japanese Application No. 2008-037822.
Casio Computer Co., Ltd., "fx-82ES fx-83ES instruction manual"; pp. 19, 25-27 [online]; Aug. 31, 2004. http://support.casio.jp/pdf/004/fx-82ES-83ES.pdf*.
Casio Computer Co, Ltd., "A scientific calculator which displays formulas as described on textbooks"; [online]; Jul. 29, 2004. http://www.casio.co.jp/release/2004/fx_82es.html*.
*Partial translations of the relevant portions of the NPL documents cited hereinabove are submitted herewith.

* cited by examiner

*Primary Examiner* — Lewis A Bullock, Jr.
*Assistant Examiner* — Michael D Yaary
(74) *Attorney, Agent, or Firm* — Holtz, Holtz, Goodman & Chick, PC

(57) ABSTRACT

When the intake input mode is set and a 2D function key, such as "√" or "a/b," is operated in a state where the cursor has been moved to an arbitrary position on the formula displayed on the display unit of an electronic calculator, the range of the formula covered by the input 2D function (or to be calculated) is determined on the basis of the position of the cursor by recognizing a formula part sandwiched by parentheses or a chunk of the formula part of a function with parentheses, recognizing a chunk of a formula part of a 2D function, recognizing a chunk of a formula part with successive numerals and characters, and recognizing the position of an arithmetic symbol ("+," "−," "×," or "÷") or a delimiter (":" or ","). The determined range is taken in by the input 2D function.

2 Claims, 6 Drawing Sheets

ELECTRONIC CALCULATOR WITH A FORMULA DISPLAY FUNCTION

CROSS-REFERENCE TO RELATED APPLICATIONS

This application is based upon and claims the benefit of priority from prior Japanese Patent Application No. 2008-037822, filed Feb. 19, 2008, the entire contents of which are incorporated herein by reference.

BACKGROUND OF THE INVENTION

1. Field of the Invention

This invention relates to an electronic calculator which displays a mathematical formula in such a natural way as written in a textbook.

2. Description of the Related Art

In many conventional scientific electronic calculators, the representational form of the mathematical formula keyed in by the user or its calculation result was such that the formula or the result was displayed in one line according to the display capability of the display unit.

For example, when a square-root formula is input, since the range covered by a root "√" cannot be displayed in a mathematically natural form, the root sign "√" is combined with such signs as parentheses or braces and the resulting formula is displayed as, for example, "√(2)" in a line.

Similarly, when a mathematical formula including a fraction is input, a numerator and a denominator cannot be displayed above and below the division sign, respectively, in a mathematically natural form. Therefore, they are displayed as "A/B" in a line.

Against this backdrop, a scientific electronic calculator capable of displaying a mathematical formula in a mathematically natural way as written in a math textbook has been disclosed in, for example, Jpn. Pat. Appln. KOKAI Publication No. 2007-264765.

The scientific electronic calculator capable of mathematically natural display has an intake input function of keying such a function as "√," "a/b," or "sin" into a mathematical formula keyed-in and displayed to edit the formula.

In the specification of the intake input function, for example, a cursor is positioned between "A" and "(B" in the formula "A(B+C)(D+E)" and "insert" key for intake and "√" key are input, causing the formula part (B+C) immediately after the cursor position where "√" was input to be taken in as the range covered by "√" and the horizontal line of the √ sign to be extended over (B+C), which enables the formula to be edited.

Furthermore, for example, when the cursor is positioned between "C)" and "(D" in the formula "A(B+C)(D+E)" and "insert" key for intake and "a/b" key are input, the formula part (B+C) immediately before the cursor position in which "a/b" key was input and the formula part (D+E) immediately after the cursor position are taken in as the range of the numerator and denominator covered by "a/b," causing (B+C) to be displayed above the division sign and (D+E) to be displayed below the division sign, which enables the formula to be edited.

As described above, the scientific electronic calculator enables such a function (2D (two-dimensional) function) as root "√" or fraction "A/B" to be displayed in mathematically natural notation. However, in a function intake input, such as root "√" or fraction "a/b," since the range taken in so as to cover the input function is restricted to a minimum formula part immediately before and after the function, a sufficient range of the formula cannot be taken in.

According to the invention, there is provided an electronic calculator capable of, when taking in a function needing mathematically natural notation, taking in a sufficient range covered by the function.

BRIEF SUMMARY OF THE INVENTION

According to an aspect of the invention, there is provided an electronic calculator comprising: formula input means for inputting a mathematical formula; display means for displaying a formula input by the formula input means; cursor display control means for displaying a cursor so as to enable the cursor to move according to the user operation over the formula displayed on the display means; intake input specifying means for specifying the intake input of a function according to the user operation; intake range decision means for, according to the input specified by the intake input specifying means, determining an intake range of a formula to be calculated using the input function from the position of the cursor, taking into account at least parentheses and arithmetic symbols, on the basis of the position of the cursor displayed for the formula; and function intake means for taking in the formula in the intake range determined by the intake range decision means as an object to be calculated using the input function.

With the invention, when a function needing mathematically natural notation is taken in, the range covered by the function can be taken in sufficiently and displayed in a mathematically natural form.

Additional objects and advantages of the invention will be set forth in the description which follows, and in part will be obvious from the description, or may be learned by practice of the invention. The objects and advantages of the invention may be realized and obtained by means of the instrumentalities and combinations practically pointed hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, referring to the accompanying drawings, an embodiment of the invention will be explained.

Figure 1:
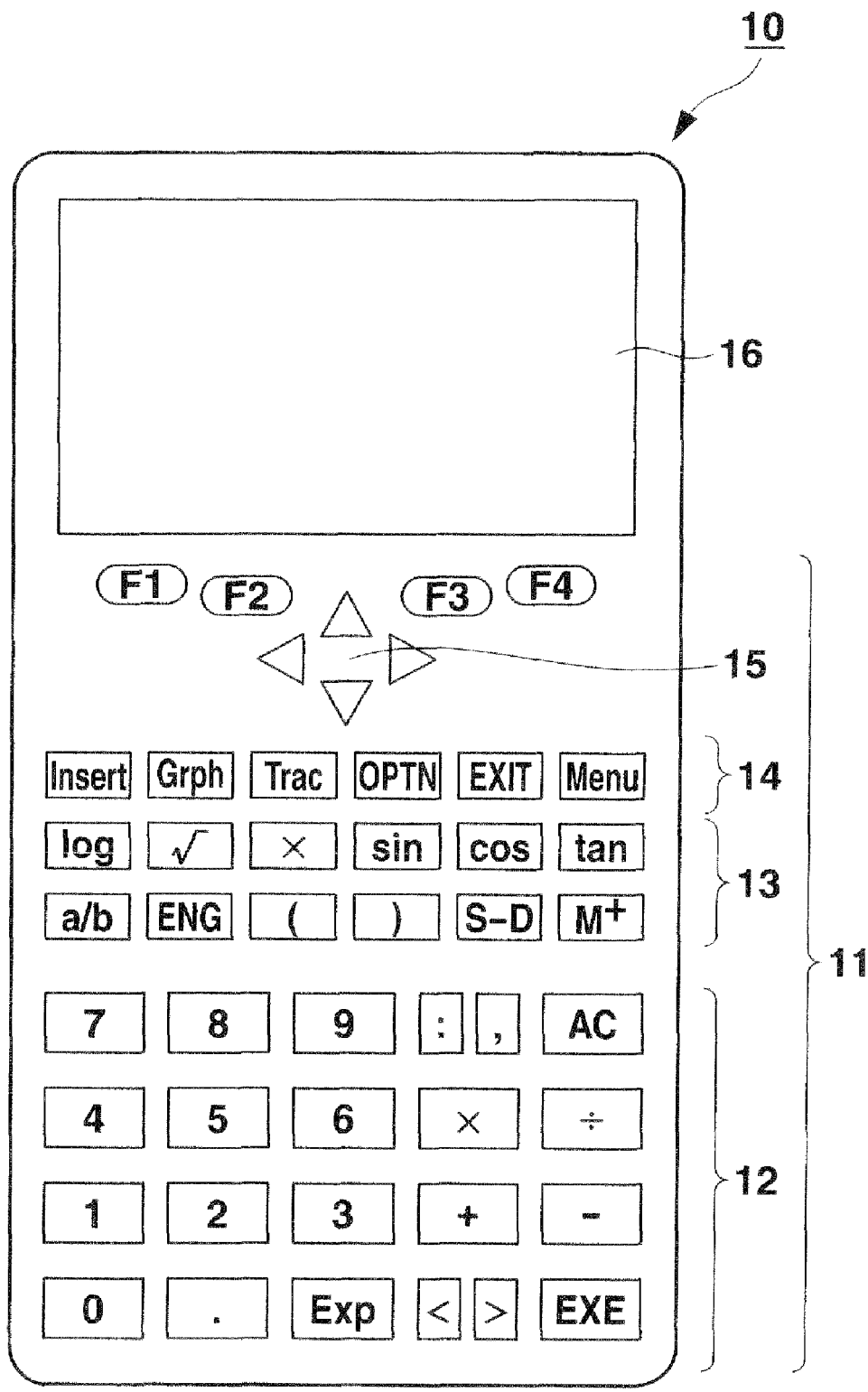
FIG. 1 is a front view showing an appearance configuration of a scientific electronic calculator 10 according to an embodiment of the invention.

FIG. 1 is a front view showing an appearance configuration of a scientific electronic calculator 10 according to an embodiment of the invention.

The scientific electronic calculator 10 is of such a small size as enables the user to hold the calculator in one hand and operate it with one hand in need of portability. On the front face of the body of the calculator 10, a key input unit 11 and a display unit 16 are provided.

The key input unit 11 includes a numeral and operation symbol key group 12 for inputting numerals or formulas or specifying the execution of calculations, a function key group 13 for inputting various functions or setting up a memory function, a mode setting key group 14 for displaying menu screens for various operation modes or specifying the setting of an operation mode, cursor keys 15 for moving the cursor Cu displayed on the display unit 16 or selecting a data item, and select keys F1 to F4 for selectively specifying various functions displayed in menu form along the lower end of the display unit 16.

The numeral and operation symbol key group 12 includes "0" to "9" (numeral) keys, "+," "−," "×," and "÷" (arithmetic symbol) keys, ":" and "," keys (delimiter) keys, "<" and ">" (comparative sign) keys, "Exp" (power function) key, "EXE" (execution) key, and "AC" (clear) key.

The function key group 13 includes "√" (root) key, "a/b" (fraction) key, and "sin" (sine) key.

The mode setting key group 14 includes "Menu" (menu) key, "Insert" (intake input) key, "Grph" (graph) key, and "Trac" (graph trace) key.

In the embodiment, a function which requires numbers and a functional symbol, such as "√" (root), "a/b" (fraction), or "Exp" (power function), constituting a formula to be developed two-dimensionally and arranged vertically to display the formula in a mathematically natural form as written in a textbook is known as a 2D (two-dimensional) function.

The display unit 16 is composed of a dot-matrix liquid-crystal display unit.

Figure 2:
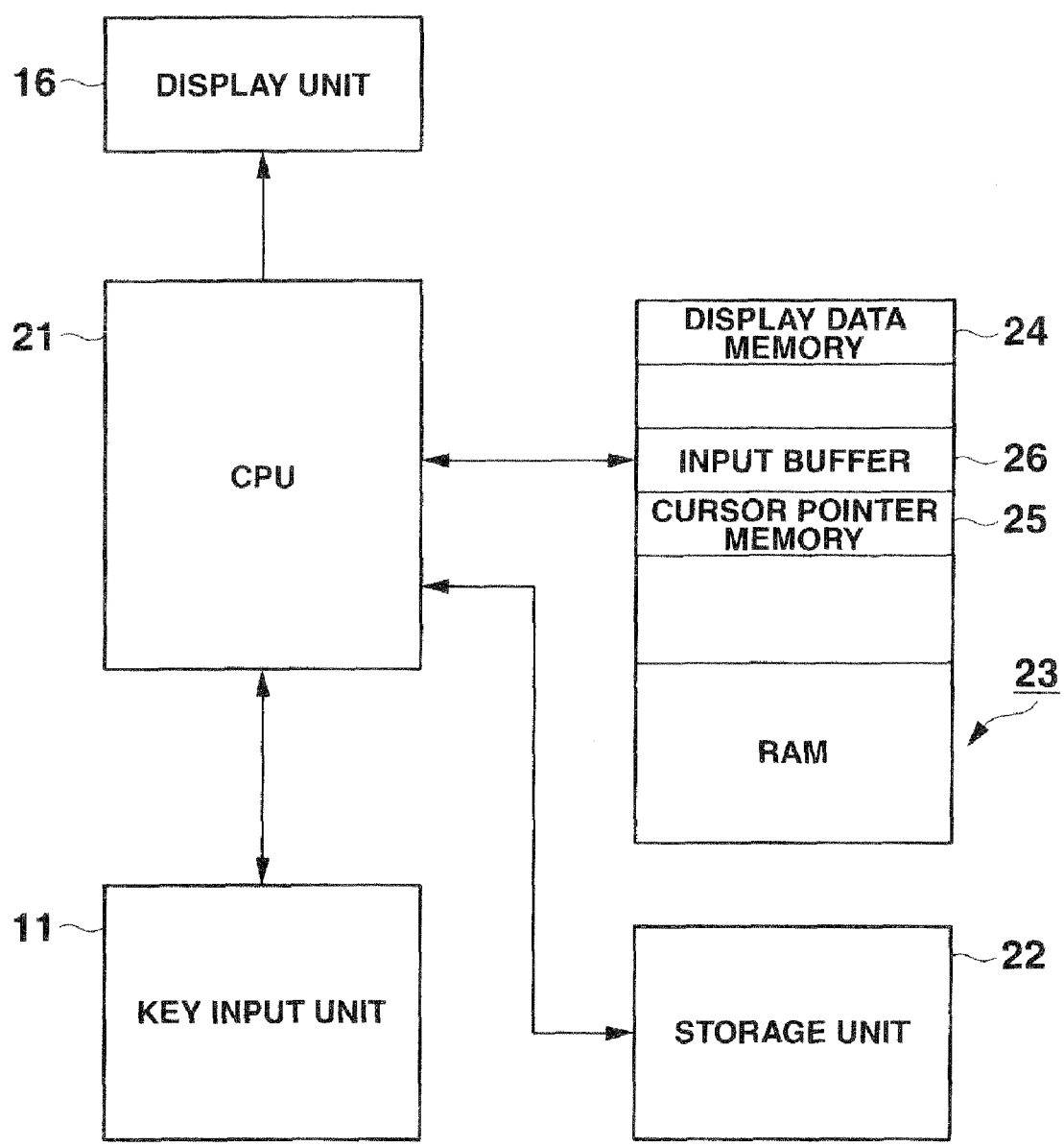
FIG. 2 is a block diagram showing the configuration of an electronic circuit of the scientific electronic calculator 10.

FIG. 2 is a block diagram showing the configuration of an electronic circuit of the scientific electronic calculator 10.

The electronic circuit of the electronic calculator 10 includes a CPU (Central Processing Unit) 21, a computer.

The CPU 21 controls the operation of each section of the circuit according to an electronic calculator control program previously stored in a storage unit 22, such as a ROM. Using a RAM 23 as a working memory, the CPU 21 performs various arithmetic processing according to a key input signal from the key input unit 11.

In the RAM 23, a display data memory 24, a cursor pointer memory 25, an input buffer memory 26, and other areas are secured.

In the display data memory 24, formula data, its calculation result, and others to be displayed on the display unit 16 are stored in such a manner that they are developed into bitmap data corresponding to the display screen of the display unit 16.

Figure 8:
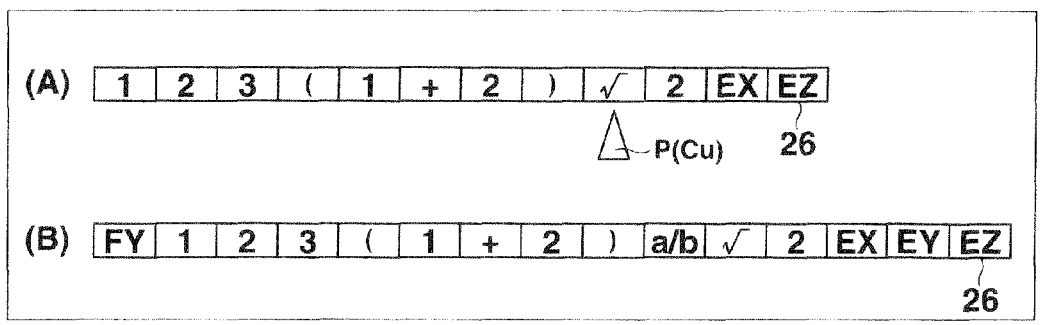
FIG. 8 shows the way the key codes stored in the input buffer 26 are changed in the process of taking in "a/b" (fraction) key shown in (B1) and (B2) of FIG. 7.

In the input buffer 26 (see FIGS. 6 and 8), key code data is stored sequentially according to the user key operation at the key input unit 11. For example, the numeric keys are stored in codes representing numbers, the function keys, including "sin", are stored in codes representing the functions, and the arithmetic symbol keys, including "+," "−," "×," and "÷," are stored in codes representing the arithmetic symbols. Further in the input buffer 26, control codes are stored in addition to the codes corresponding to the keys. For example, of the codes shown in FIG. 6, "EX" is a code representing the end of the range covered by the 2D function (√), "EZ" is a code representing the end of the formula, and "EY" is a code representing the rear end of the intake range covered by the function inserted in the intake input mode setting state according to the operation of "Insert" key. In FIG. 8, "FY" is a code representing the front end of the intake range covered by the function inserted in the intake input mode setting state.

In the cursor pointer memory 25 (see FIGS. 6 and 8), pointer data P specifying one data item in the key code data string stored in the input buffer 26 is stored. The location of the key code data indicated by the pointer corresponds to the position of the cursor Cu displayed on the display unit.

Next, the formula input and calculating function of the scientific electronic calculator 10 configured as described above will be explained.

Figure 3:
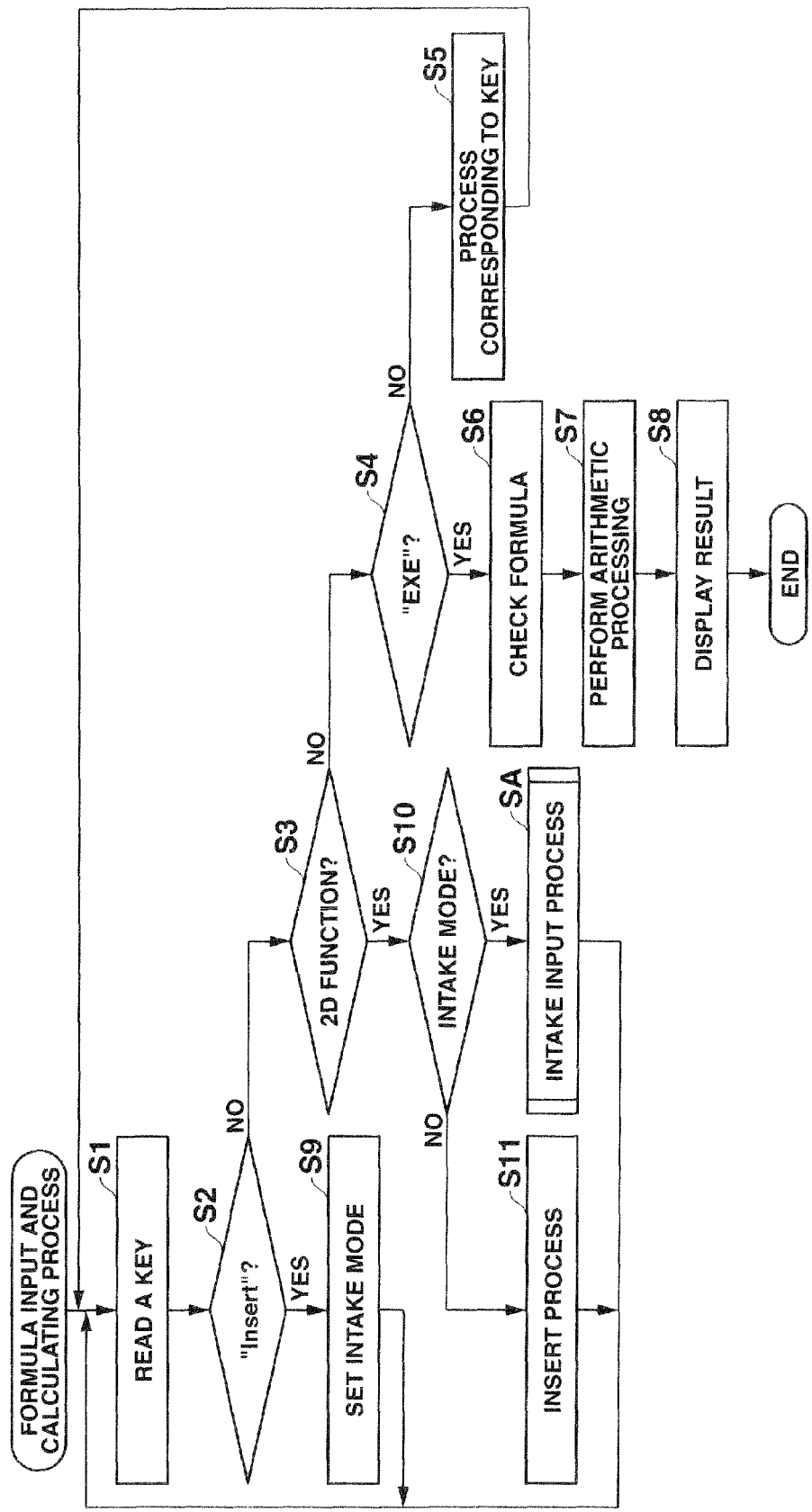
FIG. 3 is a flowchart to explain a formula input and calculating process at the scientific electronic calculator 10.

FIG. 3 is a flowchart to explain a formula input and calculating process at the scientific electronic calculator 10.

Figure 4:
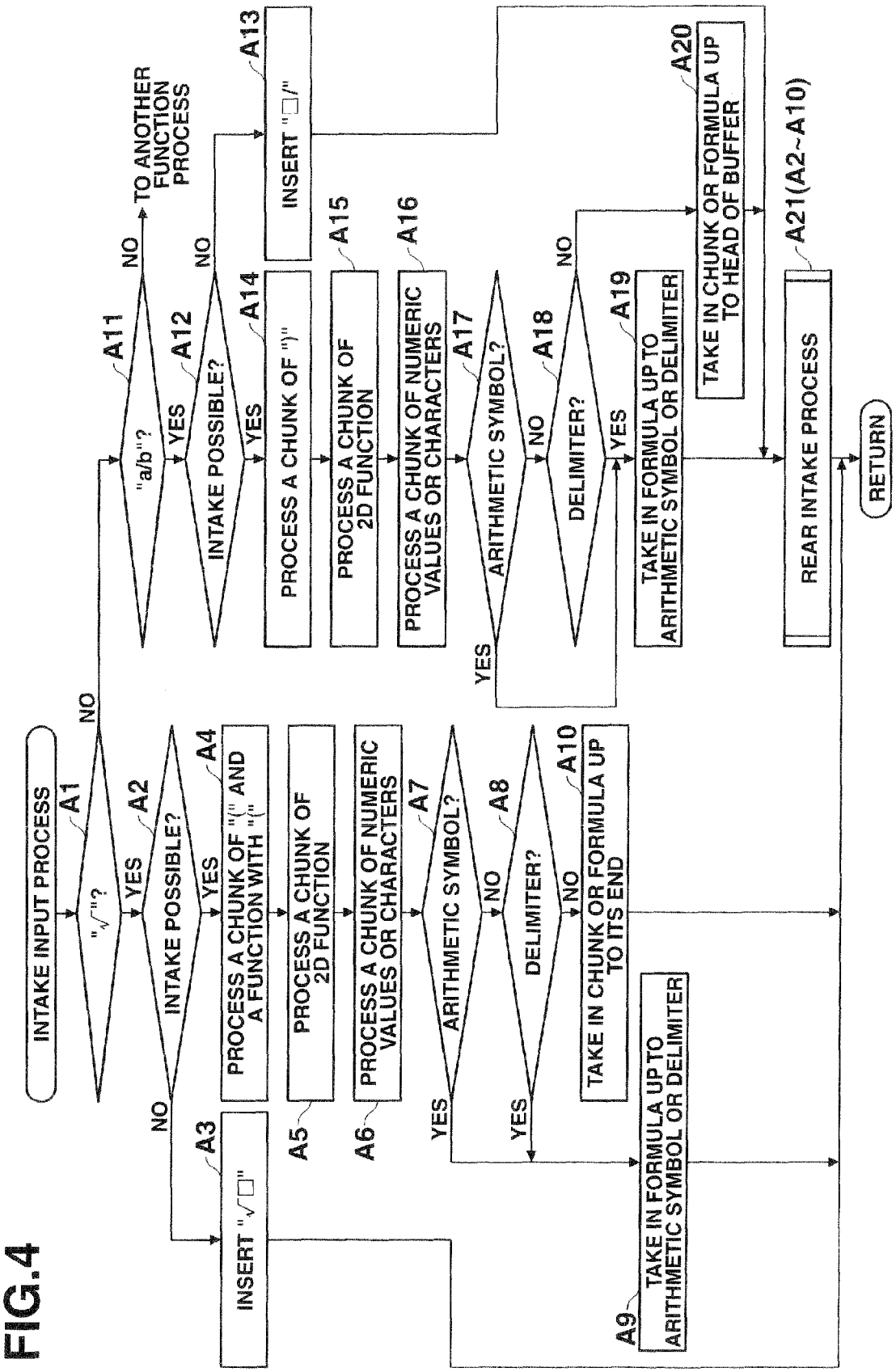
FIG. 4 is a flowchart to explain an intake input process related to the formula input and calculating process at the scientific electronic calculator 10.

FIG. 4 is a flowchart to explain an intake input process related to the formula input and calculating process at the scientific electronic calculator 10.

First, when the power supply of the scientific electronic calculator 10 is turned on, the calculator goes into the key input waiting state. If the user operates a key in the key input unit 11, the key data output from the key input unit 11 is read into the CPU 21, which determines what key has been operated (step S1). If it has been determined that none of "Insert" key, a function key belonging to the 2D functions, and "EXE" key has been input, a process corresponding to the input of the key data is carried out (step S1, S2→S3→S4→S5). Accordingly, if numeric keys, four arithmetic operation keys ("+" "−" "×" and "÷" keys), parenthetic keys, and the like have been operated, a formula input process is performed, and key code data is not only stored in the input buffer 26 but also displayed sequentially on the display unit 16. If the cursor key 15 has been operated, a cursor moving process is carried out.

Then, when the user operates "EXE" key after inputting an arbitrary formula, it is determined that "EXE" key has been operated (Yes in step S4) and the key code data stored in the input buffer 26 is read and a check is made to see if there is any problem with the contents of the formula to perform arithmetic operations (step S6). If the formula content check in step S6 has shown that there is a problem that prevents calculations, a syntax error is displayed. If the input formula has no problem, the arithmetic processing is performed (step S7) and the calculation result data is displayed on the display unit (step S8).

If "Insert" key is operated, with the formula being displayed (Yes in step S2), the operation mode of the scientific electronic calculator 10 is set to the "intake input mode" (step S9).

If a key corresponding to a 2D function, such as "√" key or "a/b" key, is operated (Yes in step S3), it is determined whether the operation mode has been set to the intake input mode (step S10). If it has been determined that the operation mode has been set to the intake input mode (Yes in step S10), control is passed to an intake input process shown in FIG. 4 (step SA). If it has been determined that the operation mode has not been set to the intake input mode (No in step S10)), the key code for the input 2D function is inserted in the position indicated by the cursor Cu (step S11).

Specifically, if "√" key has been input in a state where the intake input mode has not been set, a representation where "☐ (space)" is placed in the sign "√" is inserted in the position indicated by the cursor in the displayed formula and the input of the numerals and characters to be multiplied by "√" is awaited (step S3→S10→S11).

Furthermore, if "a/b" key has been input in a state where the intake input mode has not been set, a fraction whose numerator and denominator are each represented by "☐" is inserted, provided that a new fraction is inserted in the cursor position (step S3→S10→S11).

If a key corresponding to a 2D function, such as "√" key or "a/b" key, has been input in a state where the intake input mode has been set (step S3→S10 (Yes)), control proceeds to an intake input process (step SA). Hereinafter, the intake input process will be explained.

Figure 5:
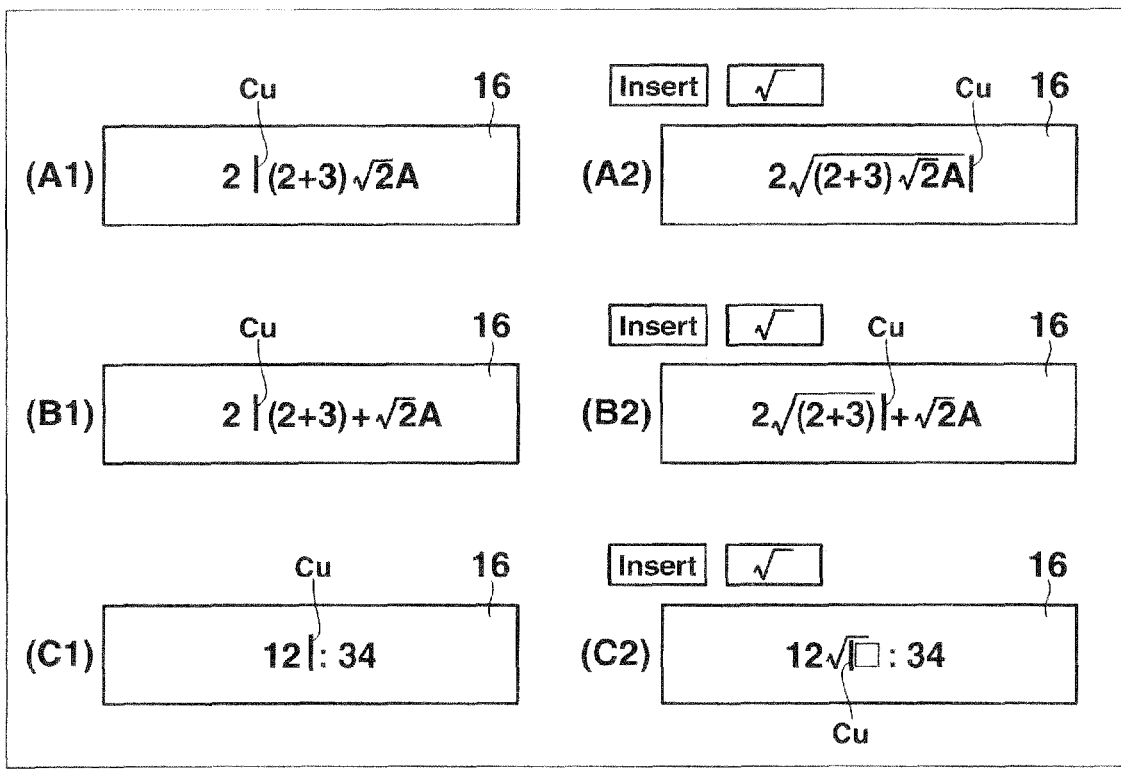
FIG. 5 shows examples of displaying the input formula related to a "√" key intake input process in the formula input and calculating process at the scientific electronic calculator 10.

FIG. 5 shows examples of displaying the input formula resulting from a "√" key intake input process in the formula input and calculating process at the scientific electronic calculator 10.

Figure 6:
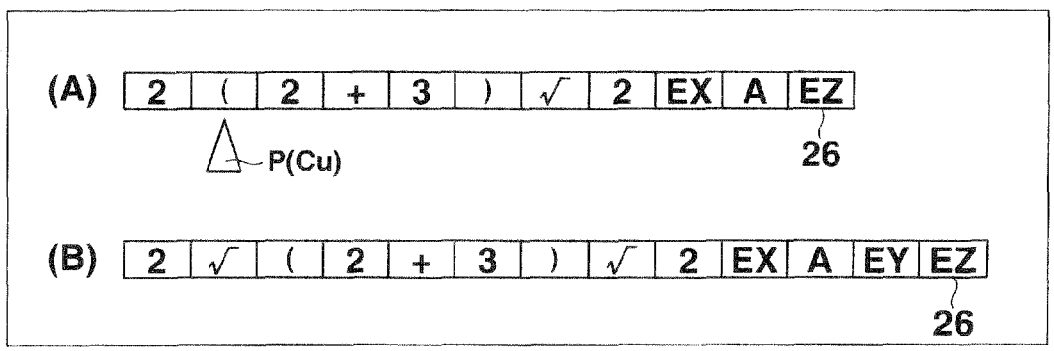
FIG. 6 shows the way the key codes stored in the input buffer 26 are changed in the process of taking in "√" key shown in (A1) and (A2) of FIG. 5.

FIG. 6 shows a state where the key codes have been stored in the input buffer 26 as a result of the process of taking in "√" key shown in (A1) and (A2) of FIG. 5.

If "√" key has been operated in the intake input process (Yes in step A1), it is determined whether "√" key can be taken in that state (step A2). That is, on the basis of each item of key code data stored in the input buffer 26 and the pointer data P stored in the cursor pointer memory 25, it is determined whether the position of the cursor on the formula presently displayed is at the tail end of the formula and whether there is an arithmetic symbol or a delimiter immediately after the cursor, thereby determining whether the input 2D function "√" can be taken in.

For example, if a key input operation is carried out to taken in "√" in the state shown in (C1) of FIG. 5, since there is a delimiter ":" immediately after the cursor Cu on the displayed formula "12|:34," it is determined that "√" cannot be taken in (No in step A2). Then, as shown in (C2) of FIG. 5, "√" and "☐ (space)" are inserted in the position indicated by the cursor Cu and the input of the numerals and characters to be multiplied by "√" is awaited (step A3).

If √ has been taken in the state shown in, for example, (A1) of FIG. 5 (or (B1) of FIG. 5), since the position of the cursor Cu is not at the tail end of the formula and there is neither an arithmetic symbol nor a delimiter immediately after the cursor on the displayed formula "2|(2+3)√2A" (or "2|(2+3)+√2A"), it is determined that "√" can be taken in (Yes in step A2).

If it has been determined that "√" can be taken in, control proceeds to the processes in step A4 to step A6 and a range where data can be processed as a chunk under the condition of each step is determined.

First, if there is a left parenthesis "(" or a function with a parenthesis, such as "sin(", in the formula immediately after the cursor Cu, the part of the formula ranging from the left parenthesis to the right parenthesis ")" is regarded as a chunk (step A4). In the example, "(2+3)" is considered to be a chunk.

Next, if there is a 2D function formula behind the cursor or the part regarded as a chunk, the formula part up to the end of the 2D function is recognized as a chunk (step A5). In (A1) of FIG. 5, "√2" is recognized as a formula part of the chunk.

Next, if there is a formula part including only numeric values or characters behind the cursor or the part regarded as a chunk, the formula part up to the end of the part is recognized as a chunk (step A6). In the case of (A1) of FIG. 5, "A" is recognized as a formula part of the chunk.

Then, if in step A4 to step A6, the formula part regarded as a chunk has been found behind the cursor Cu, or if not, it is determined whether there is an arithmetic symbol ("+," "−," "×," or "÷") (step A7). If it has been determined that there is an arithmetic symbol ("+," "−," "×," or "÷") (Yes in step A7), the formula part up to the arithmetic symbol is taken in as the range covered by the input 2D function "√" and end code "EY" is added to the end of the taken-in formula part at the input buffer 26 (step A9).

If there is no arithmetic symbol, it is determined whether there is a delimiter (":" or ",") (step A8).

If it has been determined that there is a delimiter (":" or ",") (Yes in step A8), the formula part up to the delimiter is taken in as the range covered by the input 2D function "√" and end code "EY" is added to the end of the taken-in formula part at the input buffer 26 (step A9).

Specifically, in the case of (B1) of FIG. 5, (2+3) is judged to be a formula part of the chunk in step A4 to step A6 and then it is determined that there is the arithmetic symbol "+." As a result, as shown in (B2) of FIG. 5, the formula part up to the arithmetic symbol "+" in the chunk ("(2+3)" in this case) is taken in as the range covered by the input 2D function "√."

If it has been determined that there is neither an arithmetic symbol ("+," "−," "×," or "÷") nor a delimiter (":"or",") (step A7 (No)→A8 (No)), the formula part regarded as a chunk or the formula up to its end is taken in as the range covered by the 2D function "√" and end code "EY" for an intake range is added to the end of the code of the formula part regarded as a chunk or just in front of formula end code "EZ" at the input buffer 26 (step A10).

Specifically, in the display state shown in (A1) of FIG. 5, the contents of the input buffer 26 are as shown in (A) of FIG. 6. Since the formula part of the chunk subjected to recognition processing in step A4 to step A6 is "(2+3)√2A" and it has been determined in steps A7, A8 that there is neither an arithmetic symbol ("+," "−," "×," or "÷") nor a delimiter (":," or ","), the formula part of the chunk is taken in as the range covered by the input 2D function "√" and end code "EY" is added as shown in (B) of FIG. 6 in step A10 and then the resulting formula is shown as in (A2) of FIG. 5.

Figure 7:
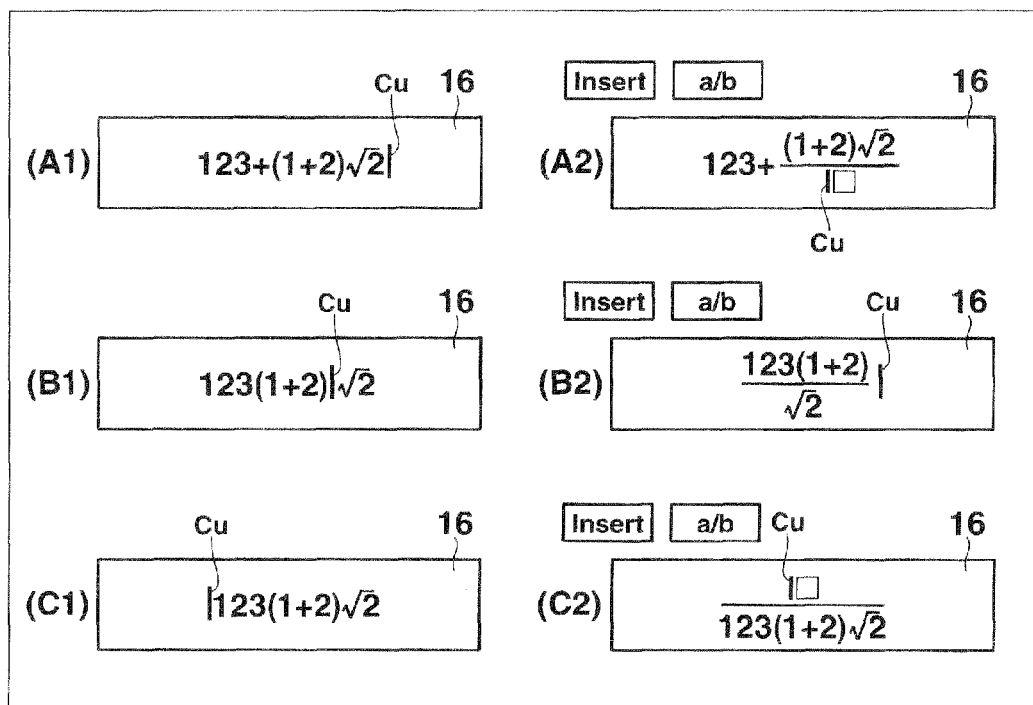
FIG. 7 shows an example of a formula input display in the process of taking in an "a/b" (fraction) key in the formula input and calculating process at the scientific electronic calculator 10.

FIG. 7 shows an example of a formula input display in the process of taking in "a/b" (fraction) key in the formula input and calculating process at the scientific electronic calculator 10.

FIG. 8 shows a state where the key codes have been stored in the input buffer 26 as a result of the process of taking in "a/b" key shown in (B1) and (B2) of FIG. 7.

If "a/b" key has been operated in the intake input process (Yes in step A11), it is determined whether the numerator data of the fraction can be taken in that state (step A12). Specifically, on the basis of each key code data item stored in the input buffer 26 and the pointer data P stored in the cursor pointer memory 25, it is determined whether the position of the cursor Cu on the formula currently displayed is at the head of the formula and further determined whether the numerator data can be taken in for the input 2D function "a/b" (step A12).

For example, if the key has been operated to take in the fraction in the state shown in (C1) of FIG. 7, since the cursor Cu is at the head of the displayed formula "|123(1+2)√2", it is determined that the numerator data cannot be taken in (No in step A12). Then, as shown in (C2) of FIG. 7, the division sign "/" is inserted in the position of the head of the formula indicated by the cursor Cu, causing the fractional expression with all of the formula as a denominator to be displayed in a mathematically natural form and the input of the numerator is awaited (step A13).

For example, if a fraction has been taken in the state shown in (B1) of FIG. 7 (or (A1) of FIG. 7), since the position of the cursor Cu is not at the head of the formula on the displayed formula "123(1+2)|√2" (or "123+(1+2)√2|"), it is determined that the fraction can be taken in (Yes in step S12).

If it has been determined that the fraction can be taken in, control proceeds to the processes in step A14 to step A16 and a range where the numerator can be processed as a chunk under the condition of each step is determined.

First, if there is a formula part ranging from a right parenthesis ")" to a left parenthesis "(" when the formula is traced back before the cursor Cu, the range is recognized as a chunk part (step A14). In the case of (B1) of FIG. 7, "(1+2)" is recognized as a chunk formula part.

Next, if there is a 2D function when the formula is traced back before the cursor Cu or the formula before the part excluding the part regarded as a chunk is traced back, the formula part ranging from the position of end code "EX" in the range covered by the 2D function to the 2D function is regarded as a chunk formula part (step A15). In the case of (A1) of FIG. 7, "√2" is recognized as a chunk formula part.

Furthermore, if there is a formula part including only numeric values and a formula part including only characters when the formula is traced back before the cursor Cu or the formula before the part regarded as a chunk is traced back, the formula part is regarded as a chunk formula part (step A16). In the case of (B1) of FIG. 7, "123" in front of "(1+2)" is recognized as a chunk.

Then, if in step A14 to step A16, the formula part regarded as a chunk has been found before the cursor Cu, it is determined whether there is an arithmetic symbol ("+," "−," "×," or "÷") or a delimiter (":" or ",") in the formula before the cursor (steps A17 and A18).

If it has been determined that there is an arithmetic symbol ("+," "−," "×," or "÷") or a delimiter (":" or ",") (Yes in step A17), the formula part traced back from the arithmetic symbol to the delimiter is taken in as the range covered by the input 2D function "a/b" and first code "FY" is added to the head of the taken-in formula part at the input buffer 26 (step A19).

After the process of taking in the numerator is completed, the process of taking in the denominator is carried out for the formula behind the cursor Cu (step A21). The process of taking in the denominator is performed in the same manner as the intake process in step A2 to step A10, with the result that the fractional expression where the formula part in the range taken in step A19 is a numerator and the formula part in the range taken in step A21 is a denominator is inserted and displayed in mathematically natural notation.

Specifically, as shown in (A1) of FIG. 7, if it has been determined that there is the arithmetic symbol "+" before the formula part of the chunk recognized in step A14 to step A16 (Yes in step A17), the formula part of the chunk up to the arithmetic symbol "+" (in this case, ("(1+2)√2") is taken in as the range of the numerator of the input 2D function "a/b" and its first code "FY" is added (step A19). Then, as a result of the rear intake process in step A21 (A2 to A10), it has been determined that the cursor Cu is at the end of the formula, thereby determining that the formula cannot be taken in, with the result that a simply input fractional expression with the formula part in the range taken in step A19 (in this case, "(1+2)√2") being set as a numerator and the denominator being in the input waiting state is displayed in mathematically natural notation.

If it has been determined that there is neither an arithmetic symbol ("+," "−," "×," or "÷") nor a delimiter (":"or ",") before the formula part of the chunk recognized in step A14 to step A16 (step A17 (No)→A18 (No)), either all the formula part of the chunk or the formula part of the chunk up to the head of the input buffer 26 is taken in as the range of the numerator of the input 2D function "a/b" and its first code "FY" is added (step A20).

Then, the formula part is taken in for the formula after the cursor Cu in the same manner as the intake process in step A2 to step A10 (step A21), with the result that a fractional expression with the formula part in the range taken in step A20 being a numerator and the formula part in the range taken in step A21 as a denominator is inserted and displayed in mathematically natural notation.

Specifically, if it has been determined that there is neither an arithmetic symbol ("+," "−," "×," or "÷") nor a delimiter (":"or ",") before the formula part (in this case, "123" "(1-2)") of the chunk recognized in step A14 to step A16 (step A17 (No)→A18 (No)) as shown in, for example, (B1) of FIG. 7 and (A) of FIG. 8, either all the formula part of the chunk or the formula part (in this case, "123" "(1+2)") of the chunk up to the head of the input buffer 26 is taken in as the range of the numerator of the input 2D function "a/b" and its first code "FY" is added (step A20) as shown in (B2) of FIG. 7 and (B) of FIG. 8. Then, by the rear intake process in step A21 (A2 to A10), the formula part after the cursor (in this case, only "√2", the chunk of the 2D function) is taken in as the formula part up to the formula end code EZ (step A2→A4 to A8→A10), with the result that a fractional expression with the formula part up to the head of the formula taken in step A20 (in this case, "123" "(1+2)") being a numerator and the formula part (in this case, "√2") up to the formula end taken in step A21 being a denominator is displayed in mathematically natural notation.

Accordingly, with the 2D function intake input function of the scientific electronic calculator 10 configured as described above, the intake input mode is set and a 2D function key, such as "√" or "a/b," is operated in a state where the cursor Cu has been moved to an arbitrary position on the displayed formula, the range of the formula covered by the input 2D function (or to be calculated) is determined according to the existence of parenthesis, a function with parentheses, a 2D function, arithmetic symbols, and delimiters, on the basis of the position of the cursor Cu.

Therefore, with the scientific electronic calculator 10 capable of displaying a formula in mathematically natural notation, when a function (e.g., a 2D (two-dimensional) function), such as "√," "a/b," or a power "Exp," is taken in, the range covered by the function can be taken in sufficiently and displayed in a mathematically natural form, enabling the user friendliness to be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic calculator which is configured to perform natural display of a mathematical formula, the electronic calculator comprising:

a formula input unit configured to input a mathematical formula;

a formula display control unit configured to display a formula input by the formula input unit on a display;

a cursor display control unit configured to display a cursor so as to enable the cursor to move according to a user operation over the formula displayed by the formula display control unit;

an intake input specifying unit configured to specify an intake input of a fraction according to a user operation;

a chunk recognition unit configured to recognize each of a formula part enclosed by a left parenthesis and a right parenthesis, a formula part enclosed as a predetermined function, and a formula part comprised of characters, as a chunk formula part, in the formula before and after a position of the cursor displayed on the formula, according to the input specified by the intake input specifying unit;

a delimitation position decision unit configured to determine whether or not an arithmetic symbol or a delimiter exists in the formula before and after the cursor position excluding the chunk formula part recognized by the chunk recognition unit;

an intake range decision unit configured to determine, if the delimitation position decision unit determines that an arithmetic symbol or a delimiter exists, each chunk formula part from the cursor position to the arithmetic symbol or the delimiter as an intake range, and to determine each chunk formula part from the cursor as the intake range if the delimitation position decision unit determines that no arithmetic symbol or delimiter exists; and a function intake unit configured to take in a formula part of a former intake range determined by the intake range decision unit as a numerator of the fraction to be calculated, and to take in a formula part of a latter intake range determined by the intake range decision unit as a denominator of the fraction to be calculated.

2. The electronic calculator according to claim 1, further comprising:

an intake disable decision unit configured to determine whether a formula part to be calculated in the numerator of the fraction is impossible to take in, depending on whether or not the position of the cursor displayed on the formula by the cursor display control unit is at a head of the formula; and a fraction insert unit configured to, when the intake disable decision unit has determined that the formula part to be calculated in the numerator of the fraction is impossible to take in, insert a division sign with an undetermined numerator in association with the position of the cursor displayed on the formula.

* * * * *